W. H. WEIGHT.
BRAKE FOR ROAD VEHICLES.
APPLICATION FILED DEC. 15, 1909.
966,722.
Patented Aug. 9, 1910.
2 SHEETS—SHEET 1.
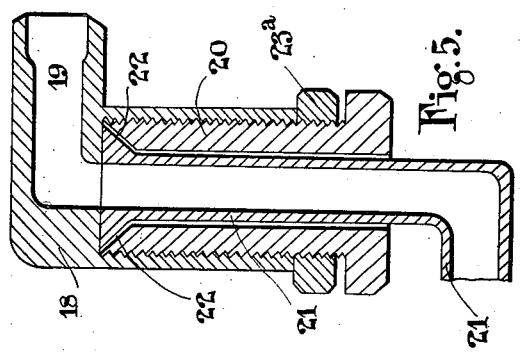
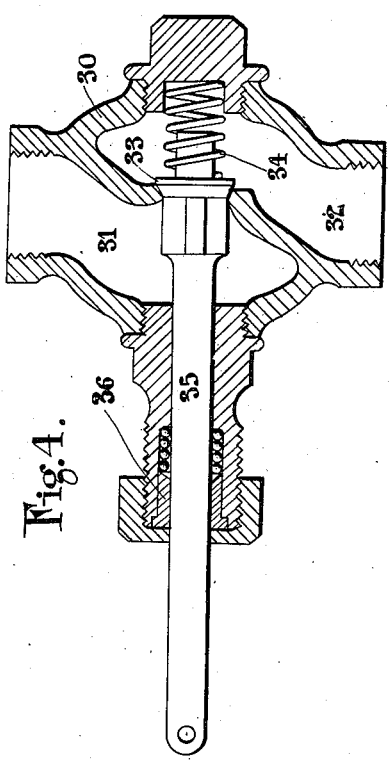
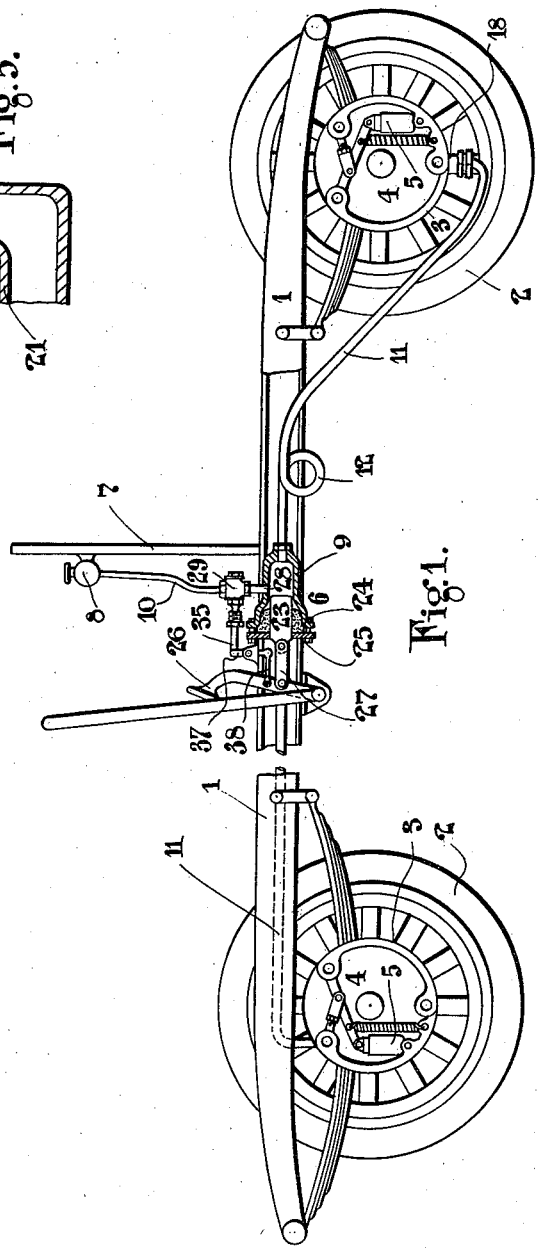
Witnesses
Inventor
William Herbert Weight
by his Attorney

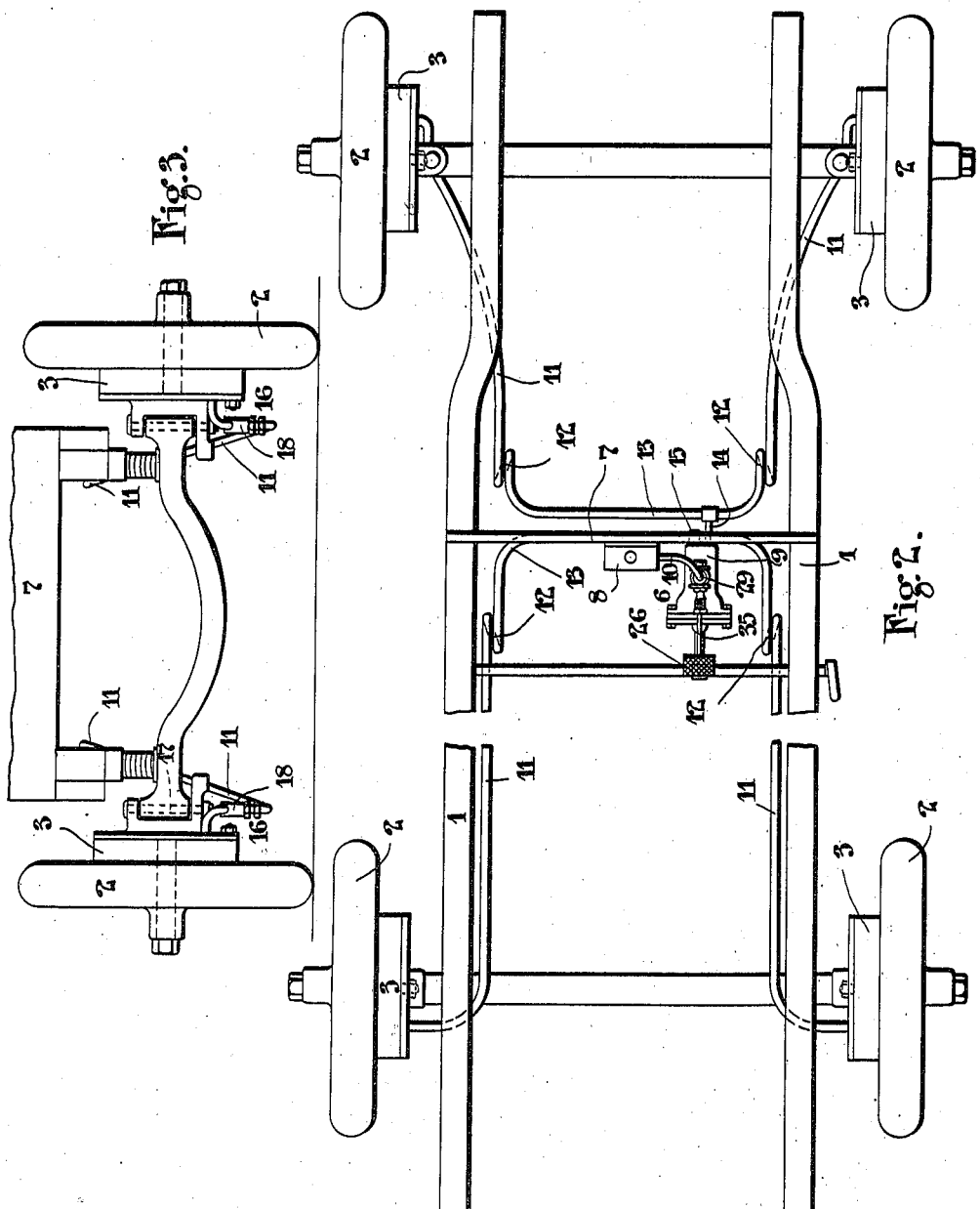

UNITED STATES PATENT OFFICE.

WILLIAM HERBERT WEIGHT, OF BISHOPSTON, BRISTOL, ENGLAND.

BRAKE FOR ROAD-VEHICLES.

966,722.  Specification of Letters Patent.  Patented Aug. 9, 1910.

Application filed December 15, 1909. Serial No. 533,182.

*To all whom it may concern:*

Be it known that I, WILLIAM HERBERT WEIGHT, a subject of the King of England, residing at Bishopston, Bristol, in England, have invented certain new and useful Improvements in Brakes for Road-Vehicles, of which the following is a specification.

This invention relates to liquid operated brake mechanism for automobiles and like vehicles of the type wherein the brake blocks are operated by pistons acting like hydraulic rams connected to a common source of fluid pressure, and it consists in improvements in the tubing leading to the several cylinders of the said pistons; in the connections to those of the brakes of the steering wheels, in the main pressure producing device, and in the means of replenishment of the latter with liquid and the release of air therefrom. In brake mechanism of this type it is essential that the tubular connections between the main pressure producer and the several hydraulic rams should be capable of withstanding the destructive effect of the vertical movements of the road wheels with respect to the frame of the vehicle and the vibrations to which the tubing is subjected. When applied to brakes of steering wheels it is further essential that the tubing be not destroyed or fatigued by the deflection of the wheels.

In the present invention I employ between the main pressure producer and the brake ram cylinder a resilient tube of copper or steel firmly connected at each end and coiled or partly coiled at some place or places intermediate of its ends so that the pipe as a whole has sufficient elasticity to permit of the movements of the brake ram cylinder without destruction of the pipe or of its connections. This pipe is so shaped as to lie freely without contact with the frame of the vehicle and is sufficiently rigid to be self supporting, although if desired it may receive additional support from spring suspenders or the like. Where the pipe is connected to the ram cylinder on a steering wheel a swivel joint is placed in the pipe and alined with the axis of the steering socket preferably beneath the latter. This joint is of a kind to permit lateral swing of the section of the pipe between it and the steering wheel in order to follow the movements of the steering wheel.

In the main pressure cylinder I provide a plunger which is of less diameter than the cylinder in which it works and when in the "off" position is clear of the replenishing pipe. The plunger passes through a cup leather which is preferably secured between the cylinder and its head or collar through which the plunger passes. The plunger therefore does not act directly to open and close the port in the cylinder wall through which the cylinder is replenished with liquid to compensate for accidental leakage, but such port is controlled by a check-valve. This check valve may be free to be operated by the pressure of the liquid, but I prefer to render its action more certain by a mechanical connection controlled by the movements of the pedal or lever by which the brakes are put in action. For this purpose I may use a plug-valve or cock or a puppet-valve pressed into closed position by a spring and opened by a plunger connected mechanically to an abutment against which the pedal or level aforesaid presses when approaching its position of rest with the brakes "off." By this means the port is held open to the replenishment chamber when the brakes are off and any air that might have been present in the main pressure cylinder is allowed free escape and the liquid free access, whereas when the brakes are to be put on, the initial movement of the pedal or lever permits the spring to close the valve and prevents escape of liquid from the main pressure cylinder to the replenishment chamber. These improvements are illustrated in the annexed drawings, in which—

Figure 1 is a longitudinal sectional elevation of the chassis of a motor road vehicle showing certain of my improvements applied thereto; Fig. 2 is a plan view of Fig. 1, and Fig. 3 a front end view thereof; Fig. 4 is a sectional detail view on an enlarged scale showing the air release or check valve and Fig. 5 is a sectional detail view also on an enlarged scale showing a swivel joint for a steering wheel.

In the said drawings 1 designates the frame of the vehicle and 2 the road wheels thereof, each of which is provided with the brake-drum 3 and interior brake-mechanism 4 of known construction including brake ram cylinders 5. The main pressure producer 6 is shown as located adjacent the dash board 7 on which is mounted the reservoir 8 for pressure liquid in communication with the main pressure cylinder 9 by means of a pipe 10. Between said cylinder 9 and each of the brake ram cylinders 5 is interposed a tube of copper or steel 11 provided with a coil as at 12. This may be a complete coil as illustrated or only a partial one or more than one coil may be provided in each tube in order to still further increase the resiliency of said tubes. The pipes 11 leading to the fore or steering wheels are coupled together by a transverse member 13 from which a branch 14 leads to the cylinder 9 and the pipes leading to the rear wheels are similarly connected by a similar transverse member extending into a connection 15 on the cylinder (see more particularly Fig. 2.)

The connection of the pipes 11 to the steering wheels is effected as shown more particularly in Figs. 3 and 5 by means of a swivel joint 16 disposed in axial alinement with the steering socket 17 immediately below same. In the form shown in the detail view Fig. 5 this joint comprises a hollow casting or boss 18 having a channel or connection 19 at the top leading to the brake ram cylinder, said boss being hollowed and interiorly threaded for reception of a screw plug or bushing 20 adapted to rotatably support a tubular member or pipe section 21 to which the end of the pipe 11 is connected (see Figs. 1 and 3). The pipe section 21 is flared and beveled at the top, as at 22 and bears upon a similarly beveled portion of the bushing 20. A lock nut 23ª is provided on the exterior of said bushing and the outer portion thereof is faced for reception of a wrench for adjusting purposes.

Referring now more particularly to Fig. 1 the main pressure cylinder 9 contains the plunger 23 of less diameter than said cylinder. The said plunger passes through the cup-leather 24 and cylinder head 25 and is connected to the foot brake lever 26 by means of a link 27. 28 shows the port in the cylinder into which the connection 10 from the reservoir 8 leads, and in said connection is interposed the check valve 29 previously referred to and a form of which is illustrated in detail in Fig. 4, from which it will be seen that said valve comprises the casing 30 provided with two liquid channels 31 and 32 adapted to be placed into or out of communication by means of the valve body 33 normally held closed against its seat by a helical spring 34 and carried by a rod 35 extending through a gland or stuffing box 36 and bearing against a double-armed lever 37, 38 connected to the brake lever 26. It will thus be seen that when the brakes are "off" as in the position of the parts shown in Fig. 1 the valve will be open and allow liquid to enter the cylinder 9 whereas when the lever 26 is moved forward to apply the brakes the valve will be closed and thus cut off communication between said cylinder and the reservoir 8.

I do not limit myself to the exact construction and arrangement of parts hereinbefore described, since the same may be varied within limits determined by the following claims without departing from the spirit of the invention.

What I claim as my invention and desire to secure by Letters Patent of the United States is:—

1. In a hydraulic brake system for road vehicles the combination with a brake ram cylinder carried by steering wheel of a vehicle, and a main pressure device, of a resilient tube connected at opposite ends to said cylinder and pressure device and a swivel joint interposed in the length of said tubing and alined with the pivotal axis of the steering wheel.

2. In a hydraulic brake system for road vehicles the combination with a brake ram cylinder carried by each of the vehicle wheels and a main pressure device supported by the vehicle, of resilient tubes each connected at opposite ends to a brake ram cylinder and to the main pressure device, a swivel joint interposed in each of said tubes which communicate with the ram cylinders of the steering wheels, said joint being alined with the pivotal axis of the steering wheel, and all the aforesaid tubes being partially coiled and so disposed as to avoid contact with the vehicle framing.

3. In a hydraulic brake system for road vehicles, the combination with a brake ram cylinder carried by a vehicle wheel of a main pressure device including a cylinder, a plunger therein of less diameter than said cylinder and a cup leather at one end of said cylinder in which said plunger slides and a connection from said ram cylinder to said pressure device.

4. In a hydraulic brake system for road vehicles the combination of a brake ram cylinder carried by a vehicle wheel, a main pressure device including a cylinder, a plunger therein of less diameter than said cylinder and a cup leather at one end of said cylinder in which said plunger slides, and a resilient tube connected at opposite ends to said ram cylinder and pressure device, said tube being partially coiled and so disposed as to avoid contact with the vehicle framing.

5. In a hydraulic brake system for road vehicles, the combination of a brake ram cylinder carried by a vehicle wheel, a main pressure device including a cylinder a connection from the pressure device to the ram cylinder, a plunger working in the pressure cylinder, a liquid reservoir, a connection from the latter to the cylinder, a valve in said connection, a plunger operating member and connections between the latter and the valve whereby said valve is held open when the operating member is in its "off" position and closed during the initial movement of the latter from said position.

6. In a hydraulic brake system for road vehicles, the combination of a brake ram cylinder carried by each of the vehicle wheels a main pressure device including a cylinder supported by the vehicle, resilient tubes each connected at opposite ends to a brake ram cylinder and to said pressure device, said tubes being partially coiled and so disposed as to avoid contact with the vehicle framing, a plunger working in the pressure cylinder, a liquid reservoir, a connection from the latter to the cylinder, a valve in said connection, a plunger operating member and connections between the latter and the valve whereby said valve is held open when the operating member is in its "off" position and closed during the initial movement of the latter from said position.

In witness whereof I have signed this specification in the presence of two witnesses.

WILLIAM HERBERT WEIGHT.

Witnesses:
 W. M. PRATT,
 FREDK. N. JONES.